(12) United States Patent
Tang

(10) Patent No.: US 11,622,383 B2
(45) Date of Patent: *Apr. 4, 2023

(54) METHOD AND DEVICE FOR CHANNEL SENSING AND SIGNAL TRANSMISSION

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/815,467

(22) Filed: Jul. 27, 2022

(65) Prior Publication Data
US 2022/0361241 A1 Nov. 10, 2022

Related U.S. Application Data

(63) Continuation of application No. 16/924,008, filed on Jul. 8, 2020, now Pat. No. 11,419,148, which is a
(Continued)

(51) Int. Cl.
*H04W 74/08* (2009.01)
*H04W 16/14* (2009.01)

(52) U.S. Cl.
CPC ....... *H04W 74/0808* (2013.01); *H04W 16/14* (2013.01)

(58) Field of Classification Search
CPC ............. H04W 74/0808; H04W 16/14; H04W 74/0825; H04W 72/0446; H04L 5/0091; H04L 5/0048
See application file for complete search history.

(56) References Cited

U.S. PATENT DOCUMENTS

2016/0100407 A1 4/2016 Gaal et al.
2016/0302230 A1 10/2016 Novlan et al.
(Continued)

FOREIGN PATENT DOCUMENTS

CN 103686772 A 3/2014
CN 105263188 A 1/2016
(Continued)

OTHER PUBLICATIONS

CATT "Further evaluations of LAA-LAA co-existence in outdoor scenario" R1-151354; 3GPP TSG RAN WG1 Meeting #80bis; Apr. 20-24, 2015. 9 pages.
(Continued)

*Primary Examiner* — Justin T Van Roie
(74) *Attorney, Agent, or Firm* — Perkins Coie LLP

(57) ABSTRACT

Provided in the embodiments of the present application are a signal transmission method and device, the method comprising: a first device determines a target channel access mechanism from at least two channel access mechanisms, the at least two channel access mechanisms being candidate channel access mechanisms for the first device to transmit first signals on an unlicensed carrier; on the basis of the target channel access mechanism, the first device performs channel sensing of the unlicensed carrier in order to determine whether time frequency resources used by the first device for sending the first signals are available, the first signals comprising at least two reference signals, the at least two reference signals comprising a first reference signal and a second reference signal, and the first reference signal being positioned before the second reference signal on the time domain.

9 Claims, 4 Drawing Sheets

Related U.S. Application Data continuation of application No. PCT/CN2018/072488, filed on Jan. 12, 2018.

(56) References Cited

U.S. PATENT DOCUMENTS

| | | |
|---|---|---|
| 2017/0048889 A1 | 2/2017 | Kadous et al. |
| 2017/0079013 A1 | 3/2017 | Noh et al. |
| 2017/0201935 A1 | 7/2017 | Um et al. |
| 2018/0020375 A1 | 1/2018 | Matsumoto et al. |
| 2018/0220442 A1 | 8/2018 | Urabayashi et al. |

FOREIGN PATENT DOCUMENTS

| | | | |
|---|---|---|---|
| CN | 105636233 | A | 6/2016 |
| CN | 105827379 | A | 8/2016 |
| CN | 105934963 | A | 9/2016 |
| CN | 105992343 | A | 10/2016 |
| CN | 106160966 | A | 11/2016 |
| CN | 106160967 | A | 11/2016 |
| CN | 106160986 | A | 11/2016 |
| CN | 106231677 | A | 12/2016 |
| CN | 106452704 | A | 2/2017 |
| CN | 106455110 | A | 2/2017 |
| CN | 106559795 | A | 4/2017 |
| CN | 106559882 | A | 4/2017 |
| CN | 106686603 | A | 5/2017 |
| CN | 106992804 | A | 7/2017 |
| CN | 107040938 | A | 8/2017 |
| CN | 107079491 | A | 8/2017 |
| CN | 107534499 | A | 1/2018 |
| EP | 3253141 | A1 | 12/2017 |
| KR | 20170137737 | A | 12/2017 |
| RU | 2629430 | C2 | 8/2017 |
| WO | 2016106662 | A1 | 7/2016 |
| WO | 2016148244 | A1 | 9/2016 |
| WO | 2016163854 | A1 | 10/2016 |
| WO | 2016165656 | A1 | 10/2016 |
| WO | 2017027807 | A2 | 2/2017 |
| WO | 2017051858 | A1 | 3/2017 |
| WO | 2017080516 | A1 | 5/2017 |
| WO | 2017135803 | A1 | 8/2017 |
| WO | 2017165087 | A1 | 9/2017 |
| WO | 2017196055 | A2 | 11/2017 |

OTHER PUBLICATIONS

CIPO, Examiner's Report for Canadian Patent Application No. 3088035, dated Aug. 4, 2021. 7 pages.
CNIPA, First Office Action for Chinese Patent Application No. 202010594311.0, dated May 25, 2021. 19 pages with English translation.
CNIPA, Second Office Action for Chinese Patent Application No. 202010594311.0, dated Aug. 17, 2021. 13 pages with English translation.
Corrected Notice of Allowability dated Jul. 5, 2022 of U.S. Appl. No. 16/924,008, filed Jul. 8, 2020.
Decision of Refusal for Japanese Application No. 2020-537691 dated Mar. 22, 2022. 6 pages with English translation.
Examination Report for Indian Application No. 202017029252 dated Sep. 15, 2021. 7 pages with English translation.
Examination Report No. 1 for Australian Patent Application No. 2018401510 dated Jan. 6, 2021. 4 pages.
Extended European Search Report for European Application No. 21194600.9 dated Dec. 2, 2021. 13 pages.
First Office Action for Russian Patent Application No. 2020125180 dated Jan. 18, 2021. 9 pages with English translation.
Huawei et al. "Discussion on usage of mini-slot in unlicensed band below 6GHz" R1-1700420 3GPP TSG RAN WG1 NR AdHoc Meeting; Spokane, USA, Jan. 16-20, 2017. 5 pages.
International Search Report dated Sep. 27, 2018 of PCT/CN2018/072488 (4 pages).
KIPO, Notice of Preliminary Rejection for Korean Patent Application No. 10-2020-7022269, dated Jun. 14, 2021. 13 pages with English translation.
Kyocera "DRS Design for LAA" R1-151463; 3GPP TSG RAN WG1 Meeting #80bis; Apr. 20-24, 2015; 4 pages.
Liang, C. et al. (2014). "Wireless Network Virtualization: A Survey, Some Research Issues and Challenges" IEEE Communications Surveys & Tutorials. 24 pages.
MCC Support "Draft Report of 3GPP TSF RAN WG1 #91 v0.1.0" R1-180xxxx; 3GPP TSF RAN WG1 Meeting #92; Athens, Greece; Feb. 26-Mar. 2, 2018. 193 pages.
Non-Final Office Action dated Dec. 15, 2021 of U.S. Appl. No. 16/924,008, filed Jul. 8, 2020.
Notice of Allowance for Korean Application No. 10-2020-7022269 dated Jun. 9, 2022. 4 pages with English translation.
Notice of Allowance dated Apr. 8, 2022 of U.S. Appl. No. 16/924,008, filed Jul. 8, 2020.
Notice of Reasons for Refusal for Japanese Application No. 2020-537691 dated Aug. 27, 2021. 8 pages with English translation.
Notification of Reason for Refusal for Korean Application No. 10-2020-7022269 dated Dec. 11, 2021. 5 pages with English translation.
Notification to Grant a Patent for Chinese Application No. 202010594311.0 dated Nov. 5, 2021. 12 pages with English translation.
OPPO "Channel access mechanisms for NR unlicensed" R1-1802125; 3GPP TSG RAN WG1 Meeting #92; Feb. 26-Mar. 2, 2018. 3 pages.
Wu, Y. "Uplink Resource Allocation Techniques for Massive Accesses for M2M Communications" Doctoral Dissertation; Beijing University of Posts and Telecommunications; Apr. 24, 2017; 134 pages with English abstract.
Cover: 3rd Generation Partnership Project; 3GPP TS 36.213 V14.3.0, Jun. 2017, pp. 1-7, 2017, pp. 1-7.
3rd Generation Partnership Project; 3GPP TS 36.213 V14.3.0, Jun. 2017, pp. 306-390.
3rd Generation Partnership Project; 3GPP TS 36.213 V14.3.0, Jun. 2017, pp. 391-447.
Annex A: 3rd Generation Partnership Project; 3GPP TS 36.213 V14.3.0, Jun. 2017, pp. 448-460.
3rd Generation Partnership Project; 3GPP TS 36.213 V14.3.0, Jun. 2017, pp. 50-305.
3rd Generation Partnership Project; 3GPP TS 36.213 V14.3.0, Jun. 2017, pp. 8-49.
Intel Corporation: "Considerations on the impact of unlicensed access to 5G design", 3GPP Draft; R2-165003_5G_Unlicensed V04, Aug. 21, 2016.
Sony: "DRS design for NR unlicensed spectrum", 3GPP Draft; R1-1720474, 3rd Generation Partnership Project 3GPP), Nov. 18, 2017.
Supplementary European Search Report dated Nov. 13, 2020 cited in EP 18900250.
Written Opinion dated Sep. 27, 2018 of PCT/CN2018/072488 with English translation (9 pages).

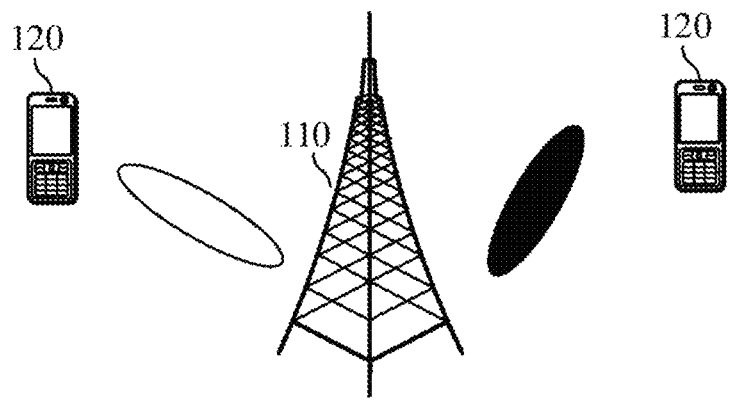

A first device determines a target channel access mechanism from at least two channel access mechanisms, wherein the at least two channel access mechanisms are candidate channel access mechanisms for the first device to transmit a first signal on an unlicensed carrier.  — S210

The first device performs channel sensing on the unlicensed carrier according to the target channel access mechanism, so as to determine whether a time frequency resource used by the first device for sending the first signal is available, wherein the first signal includes at least two reference signals, the at least two reference signals include a first reference signal and a second reference signal, and the first reference signal is located before the second reference signal on a time domain.  — S220

FIG. 2

METHOD AND DEVICE FOR CHANNEL SENSING AND SIGNAL TRANSMISSION

CROSS-REFERENCE TO RELATED APPLICATION

This application is a continuation application of U.S. application Ser. No. 16/924,008, which is now issued as U.S. Pat. No. 11,419,148, filed on Jul. 8, 2020 which is a continuation application of International PCT Application No. PCT/CN2018/072488, having an international filing date of Jan. 12, 2018, the entire content of which is hereby incorporated by reference.

TECHNICAL FIELD

Implementations of the present disclosure relate to the field of communication, and more particularly, relate to a signal transmission method and device.

BACKGROUND

In a Long Term Evolution (LTE)-based licensed-assisted access (LAA-LTE) system, a service is provided for a terminal device with a carrier on a licensed spectrum as a primary carrier and a carrier on an unlicensed spectrum as a secondary carrier. Wherein, on the unlicensed spectrum, a communication device follows a principle of "Listen Before Talk (LBT)", that is, the communication device needs to perform channel listening first before sending signals on a channel of the unlicensed spectrum, and determines whether data transmission can be performed according to the channel listening result.

When the New Radio (NR) technology is applied to an unlicensed carrier, a network device may use different beam directions or different signal transmission durations to send signals. In this case, how to perform channel sensing to send signals is an urgent problem to be solved.

SUMMARY

Implementations of the present disclosure provide a signal transmission method and device.

In a first aspect, a signal transmission method is provided, and the method includes: determining, by a first device, a target channel access mechanism from at least two channel access mechanisms, wherein the at least two channel access mechanisms are candidate channel access mechanisms for the first device to transmit a first signal on an unlicensed carrier; and performing, by the first device, a channel sensing on the unlicensed carrier according to the target channel access mechanism, to determine whether a time frequency resource used by the first device for sending the first signal is available, wherein the first signal includes at least two reference signals, the at least two reference signals include a first reference signal and a second reference signal, and the first reference signal is located before the second reference signal on a time domain.

Optionally, the first device is a network device.

Optionally, the first reference signal is a downlink synchronization signal, and/or the second reference signal is a downlink synchronization signal.

Optionally, the time frequency resource for sending the first signal is not used for sending a downlink physical channel.

Optionally, the first device is a terminal device.

Optionally, the first reference signal is an uplink sounding reference signal, and/or the second reference signal is an uplink sounding reference signal.

Optionally, the time frequency resource for sending the first signal is not used for sending an uplink physical channel.

In one possible implementation, determining, by the first device, the target channel access mechanism from the at least two channel access mechanisms, includes: determining, by the first device, the target channel access mechanism from the at least two channel access mechanisms according to at least one of the following items: a duration of a time domain resource occupied by the first signal, a size of a subcarrier spacing corresponding to the first signal, a number of reference signals included in the first signal, a priority of the first signal, and an interference situation in a transmission direction of the first signal.

In one possible implementation, the target channel access mechanism is a first type of channel access mechanism, the first type of channel access mechanism is a single channel sensing, and the first device determines, according to the first type of channel access mechanism, that a maximum duration of a time domain resource which may be used by the first device on the unlicensed carrier is less than or equal to a first time duration.

Optionally, the first time duration is 1 millisecond.

In one possible implementation, performing, by the first device, the channel sensing on the unlicensed carrier according to the target channel access mechanism includes: performing, by the first device, the channel sensing on the unlicensed carrier according to the first type of channel access mechanism, and determining whether a first time domain resource which may be used by the first device for sending the first signal on the unlicensed carrier is available.

In one possible implementation, the method further includes: sending, by the first device, the first reference signal and the second reference signal on the first time domain resource in a situation that the first time domain resource is available.

Optionally, the first device does not send a physical channel on the first time domain resource.

In one possible implementation, the method further includes: sending a filling signal between sending the first reference signal and sending the second reference signal, wherein the filling signal and the second reference signal are subjected to a same precoding processing.

In one possible implementation, performing, by the first device, the channel sensing on the unlicensed carrier according to the target channel access mechanism includes: performing, by the first device, the channel sensing on the unlicensed carrier in a first direction according to the first type of channel access mechanism, and determining whether a second time domain resource which may be used by the first device for sending the first reference signal on the unlicensed carrier is available.

In one possible implementation, the method further includes: sending, by the first device, the first reference signal on the second time domain resource in a situation that the second time domain resource is available.

Optionally, the first device does not send a physical channel on the second time domain resource.

In one possible implementation, performing, by the first device, the channel sensing on the unlicensed carrier according to the target channel access mechanism includes: performing, by the first device, the channel sensing on the unlicensed carrier in a second direction according to the first type of channel access mechanism, and determining whether a third time domain resource which may be used by the first device for sending the second reference signal on the unlicensed carrier is available.

In one possible implementation, the method further includes: sending, by the first device, the second reference signal on the third time domain resource in a situation that the third time domain resource is available.

Optionally, the first device does not send a physical channel on the third time domain resource.

In one possible implementation, an energy detection threshold for performing the channel sensing on the unlicensed carrier according to the first type of channel access mechanism is a first threshold, an energy detection threshold for performing the channel sensing on the unlicensed carrier in a first direction according to the first type of channel access mechanism is a second threshold, and the second threshold is greater than or equal to the first threshold.

In one possible implementation, the target channel access mechanism is a second type of channel access mechanism, the second type of channel access mechanism is channel sensing based on a contention window, and the first device determines, according to the second type of channel access mechanism, that a maximum duration of a time domain resource which may be used by the first device on the unlicensed carrier is greater than a first time duration.

Optionally, a parameter corresponding to the second type of channel access mechanism is determined according to the duration of the time domain resource occupied by the first signal.

In one possible implementation, performing, by the first device, the channel sensing on the unlicensed carrier according to the target channel access mechanism includes: performing, by the first device, the channel sensing on the unlicensed carrier according to the second type of channel access mechanism, and determining a fourth time domain resource which may be used by the first device for sending the first signal on the unlicensed carrier.

In one possible implementation, the method further includes: sending, by the first device, the first reference signal and the second reference signal on the fourth time domain resource in a situation that the fourth time domain resource is available.

Optionally, the first device does not send a physical channel on the fourth time domain resource.

In one possible implementation, the method further includes: sending a filling signal between sending the first reference signal and sending the second reference signal, wherein the filling signal and the second reference signal are subjected to a same precoding process.

In one possible implementation, performing, by the first device, the channel sensing on the unlicensed carrier according to the target channel access mechanism includes: performing, by the first device, the channel sensing on the unlicensed carrier in a first direction according to the second type of channel access mechanism, and determining whether a fifth time domain resource which may be used by the first device for sending the first reference signal on the unlicensed carrier is available.

In one possible implementation, the method further includes: sending, by the first device, the first reference signal on the fifth time domain resource in a situation that the fifth time domain resource is available.

Optionally, the first device does not send a physical channel on the fifth time domain resource.

In one possible implementation, performing, by the first device, the channel sensing on the unlicensed carrier according to the target channel access mechanism includes: performing, by the first device, the channel sensing on the unlicensed carrier in a second direction according to the second type of channel access mechanism, and determining a sixth time domain resource which may be used by the first device for sending the second reference signal on the unlicensed carrier.

In one possible implementation, the method further includes: sending, by the first device, the second reference signal on the sixth time domain resource in a situation that the sixth time domain resource is available.

Optionally, the first device does not send a physical channel on the sixth time domain resource.

Optionally, parameters for the second type of channel access mechanism in the first direction and the second direction are the same. Alternatively, the channel access parameter with the highest priority is used in both the first direction and the second direction.

In one possible implementation, an energy detection threshold for performing the channel sensing on the unlicensed carrier according to the second type of channel access mechanism is a third threshold, an energy detection threshold for performing the channel sensing on the unlicensed carrier in a first direction according to the second type of channel access mechanism is a fourth threshold, and the fourth threshold is greater than or equal to the third threshold.

In one possible implementation, the first reference signal and the second reference signal are reference signals which are subjected to different precoding processing.

In a second aspect, a signal transmission device is provided and the signal transmission device is used for performing the method in the first aspect or in any possible implementation of the first aspect described above. Specifically, the device includes units configured to perform the method in the first aspect or in any possible implementation of the first aspect described above.

In a third aspect, a signal transmission device is provided, and the device includes a memory, a processor, an input interface, and an output interface. The memory, the processor, the input interface and the output interface are connected through a bus system. The memory is used for storing instructions, and the processor is used for executing the instructions stored in the memory to perform the method in the first aspect or in any possible implementation of the first aspect described above.

In a fourth aspect, a computer storage medium is provided and is used for storing computer software instructions for performing the method in the first aspect or in any possible implementation of the first aspect described above, and the computer software instructions include programs designed for performing the above aspect.

In a fifth aspect, a computer program product containing instructions is provided, when the instructions are run on a computer, the computer is caused to perform the method in the first aspect or in any possible implementation of the first aspect described above.

BRIEF DESCRIPTION OF DRAWINGS

FIG. 1 is a schematic diagram of a communication system according to an implementation of the present disclosure.

FIG. 2 is a schematic flowchart of a signal transmission method according to an implementation of the present disclosure.

DETAILED DESCRIPTION

Figure 3:
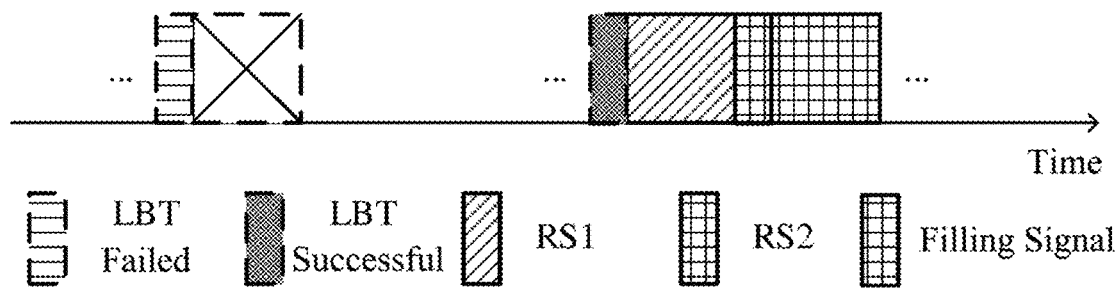
FIG. 3 is a schematic diagram of an example of a signal transmission method according to an implementation of the present disclosure.

Hereinafter, technical solutions in the present disclosure will be described with reference to the accompanying drawings.

The terms "component", "module", "system", and the like, as used in the specification, are used to represent a computer-related entity, hardware, firmware, a combination of hardware and software, software, or software in execution. For example, a component may be, but is not limited to, a process running on a processor, a processor, an object, an executable file, an execution thread, a program and/or a computer. By way of illustration, both an application running on a computing device and a computing device may be components. One or more components may reside in a process and/or an execution thread, and the components may be located on one computer and/or distributed among two or more computers. Moreover, these components may be executed from various computer readable media with various data structures stored thereon. A component may, for example, communicate through local and/or remote processes according to signals having one or more data packets (e.g., data from two components interacting with a local system, a distributed system, and/or another component in a network, such as the Internet interacting with other systems via signals).

It should be understood that, an implementation of the present disclosure may be applied to various communication systems, such as, a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, an LTE-based access to unlicensed spectrum (LTE-U) system, a New Radio (NR) system, and an evolution system of an NR system such as an NR-based access to unlicensed spectrum (NR-U) system, a universal mobile telecommunications system (UMTS), Wireless Local Area Networks (WLAN), Wireless Fidelity (WiFi), or a next generation communication system.

Generally speaking, the number of connections supported by a traditional communication system is limited and easy to implement. However, with the development of the communication technology, a mobile communication system will not only support the traditional communication, but also support, for example, the Device to Device (D2D) communication, the Machine to Machine (M2M) communication, the Machine Type Communication (MTC), and the Vehicle to Vehicle (V2V) communication.

A communication system in an implementation of the present disclosure may be applied to a Carrier Aggregation (CA) scenario, a Dual Connectivity (DC) scenario, and a Standalone (SA) network deployment scenario.

When a communication system in an implementation of the present disclosure is applied to an unlicensed spectrum and a network deployment scenario is CA, the CA network deployment scenario may be that a primary carrier is on a licensed spectrum, a secondary carrier is on an unlicensed spectrum, and the primary carrier and the secondary carrier are connected through an ideal backhaul.

When a communication system in an implementation of the present disclosure is applied to an unlicensed spectrum and the network deployment scenario is DC, the DC network deployment scenario may be that a primary carrier is on a licensed spectrum, a secondary carrier is on an unlicensed spectrum, and the primary carrier and the secondary carrier are connected through a non-ideal backhaul. Wherein, a system on a primary carrier and a system on a secondary carrier may be different systems, for example, a system on a primary carrier is an LTE system, and a system on a secondary carrier is an NR system. Or, a system on a primary carrier and a system on a secondary carrier may also be the same systems, for example, systems on a primary carrier and a secondary carrier are both LTE systems or both NR systems.

When a communication system in an implementation of the present disclosure is applied to an unlicensed spectrum and a network deployment scenario is SA, a terminal device may access a network through the system on the unlicensed spectrum.

The present disclosure describes various implementations in connection with a network device and a terminal device.

The terminal device may also refer to a User Equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus. The terminal device may be a station (ST) in WLAN, a cellular phone, a cordless phone, a Session Initiation Protocol (SIP) phone, a Wireless Local Loop (WLL) station, a Personal Digital Assistant (PDA), a handheld device with a wireless communication function, a computing device or other processing device connected to a wireless modem, an on-board device, a wearable device, or a next generation communication system such as a terminal device in the fifth-generation (5G) network or a terminal device in a future evolving Public Land Mobile Network (PLMN).

As an example but not a limitation, in an implementation of the present disclosure, the terminal device may also be a wearable device. A wearable device may also be called a wearable smart device, which is a general term of wearable devices which are developed by performing smart design on daily wear develops by using wearing technology, such as glasses, gloves, watches, clothing and shoes. A wearable device is a portable device that is worn directly on the body or integrated into the user's clothes or accessories. A wearable device not only is a hardware device, but also implements powerful functions through software support, data interaction and cloud interaction. Generalized wearable smart devices include smart watches or smart glasses which are full-featured and large in size and can realize full or partial functions without relying on smart phones, and various smart bracelets and smart jewelry for physical sign monitoring which are only focused on certain application functions and need to be used together with other devices such as smart phones.

The network device may be a device for communicating with a mobile device, or the network device may be an access point (AP) in WLAN, a Base Transceiver Station (BTS) in GSM or CDMA, a NodeB (NB) in WCDMA, an Evolutional Node B (eNB or eNodeB) in LTE, a relay station or an access point, an in-vehicle device, a wearable device, a network device in a future 5G network, or a network device in a future evolved PLMN network.

In an implementation of the present disclosure, a network device provides services for a cell, and a terminal device communicates with the network device through a transmission resource (e.g., a frequency domain resource or spectrum resource) used by the cell. The cell may be a cell corresponding to a network device (e.g., a base station), the cell may be a macro base station, or may be a base station corresponding to a small cell. Small cells here may include: a Metro cell, Micro cell, Pico cell, Femto cell, etc. These small cells have characteristics of small coverage and low transmission power, and are suitable for providing high-speed data transmission services.

In an implementation of the present disclosure, multiple cells may work at the same frequency on a carrier in an LTE system or a 5G system at the same time. In some special scenarios, concepts of the above carrier and a cell may also be considered to be equivalent. For example, in a Carrier Aggregation (CA) scenario, when a UE is configured with a secondary carrier, a carrier index of the secondary carrier and a cell identification (Cell ID) of a secondary cell working at the secondary carrier may be carried at the same time. In this case, it may be considered that a carrier and a cell have an equivalent concept, such as a UE accessing a carrier and a UE accessing a cell are equivalent.

The method and device provided by implementations of the present disclosure may be applied to a terminal device or a network device, wherein the terminal device or the network device includes a hardware layer, an operating system layer running over the hardware layer, and an application layer running over the operating system layer. The hardware layer includes hardware such as a central processing unit (CPU), a memory management unit (MMU), and a memory (also known as a main storage). The operating system may be any one or more computer operating systems that implement services processing through processes, such as a Linux™ operating system, a Unix™ operating system, an Android™ operating system, an iOS™ operating system, or a Windows™ operating system. The application layer includes applications such as browsers, contacts, word processing software, or instant messaging software. Further, a specific structure of an execution subject of a method in an implementation of the present disclosure is not particularly restricted, as long as communication may be performed according to the method of the implementation of the present disclosure by running a program that records codes of the method of the implementation of the present disclosure. For example, the execution subject of the method according to the implementation of the present disclosure may be a terminal device or a network device, or may be a functional module capable of calling and executing the program in the terminal device or the network device.

In addition, various aspects or features of implementations of the present disclosure may be implemented as methods, apparatuses, or articles of manufacture using standard programming and/or engineering techniques. The term "article of manufacture" used in the present disclosure encompasses a computer program accessible from any computer-readable device, carrier, or medium. For example, the computer-readable medium may include, but not limited to, a magnetic storage device (such as a hard disk, a floppy disk, or a magnetic tape), a disk (such as a compact disc (CD), a digital versatile disc (Digital Versatile Disc, DVD)), a smart card and flash storage device (such as Erasable Programmable Read-Only Storage (EPROM), card, stick or key drive). In addition, various storage mediums described here may represent one or more devices and/or other machine-readable mediums for storing information. The term "machine-readable medium" may include, but not limited to, a radio channel and various other mediums capable of storing, containing, and/or carrying instructions and/or data.

It should be noted that a downlink physical channel of an implementation of the present disclosure may include a physical downlink control channel (PDCCH), an enhanced physical downlink control channel (EPDCCH), a physical downlink shared channel (PDSCH), a physical hybrid ARQ indicator channel (PHICH), a physical multicast channel (PMCH), a physical broadcast channel (PBCH), etc. A downlink reference signal may include a downlink synchronization signal, a phase tracking reference signal (PT-RS), a downlink demodulation reference signal (DMRS), a channel state information-reference signal (CSI-RS), etc. Wherein, the downlink synchronization signal may be used by a communication device to access a network and used for radio resource management and measurement, the downlink DMRS may be used for demodulation of a downlink channel, the CSI-RS may be used for measurement of a downlink channel, and the PT-RS may be used for downlink time-frequency synchronization or phase tracking. It should be understood that an implementation of the present disclosure may include a downlink physical channel or a downlink reference signal having a same name as above but a different function, or may include a downlink physical channel or a downlink reference signal having a same function as above but a different name, which is not restricted in the present disclosure.

It should be noted that an uplink physical channel in an implementation of the present disclosure may include a physical random access channel (PRACH), a physical uplink control channel (PUCCH), a physical uplink shared channel (PUSCH), etc. An uplink reference signal may include an uplink demodulation reference signal (DMRS), a sounding reference signal (SRS), a phase tracking reference signal (PT-RS), and the like. Wherein, the uplink DMRS may be used for demodulation of an uplink channel, the SRS may be used for measurement of an uplink channel, and the PT-RS may be used for uplink time-frequency synchronization or phase tracking. It should be understood that an implementation of the present disclosure may include an uplink physical channel or an uplink reference signal having a same name as above but a different function, or may include an uplink physical channel or an uplink reference signal having a same function as above but a different name, which is not restricted in the present disclosure.

FIG. 1 is a schematic diagram of a communication system according to an implementation of the present disclosure. As shown in FIG. 1, the communication system 100 includes a network device 110 and a terminal device 120.

The network device 110 may be any implementation of the aforementioned network device, and the terminal device 120 may be any implementation of the aforementioned terminal device, which will not be described here again.

It should be understood that the communication system 100 may refer to a PLMN network, a D2D network, an M2M network or another network. FIG. 1 is only a simplified schematic diagram of an example, and other network devices may also be included in the network, which is not shown in FIG. 1.

Next, a frequency domain resource for wireless communication according to an implementation of the present disclosure will be described in detail.

In an implementation of the present disclosure, a frequency domain resource used by a network device and a terminal device for wireless communication (e.g., uplink transmission or downlink transmission) is a frequency domain resource used based on a contention mechanism.

For example, a network device and/or a terminal device may detect whether a frequency domain resource having a certain bandwidth (e.g., 20 MHz) is currently in an idle state, or whether the frequency domain resource is used by other devices.

If the frequency domain resource is in an idle state, or if the frequency domain resource is not used by other devices, the network device and/or terminal device may use the frequency domain resource for communication, for example, for uplink transmission or downlink transmission.

If the frequency domain resource is not in an idle state, or if the frequency domain resource is already used by other devices, the network device and/or terminal device cannot use the frequency domain resource.

As an example but not a limitation, in an implementation of the present disclosure, a frequency domain resource used by the communication system 100 (or a frequency domain resource used by the network device and the terminal device based on the contention mechanism) may also be a licensed spectrum resource, that is, the communication system 100 of an implementation of the present disclosure is a communication system capable of using a licensed frequency band, and each communication device (network device and/or terminal device) within the communication system 100 may use the frequency domain resource of the licensed frequency band in a contention way.

"A licensed frequency domain resource" may also be called "a licensed spectrum resource" or "a licensed carrier", which refers to a frequency domain resource which may only be used under the approval of the national or local wireless committee. Different systems, such as an LTE system and a WiFi system, or systems included by different operators cannot share a licensed frequency domain resource.

A licensed spectrum resource may be designated by the radio management committee of the government. A spectrum resource with a special purpose, such as a spectrum resource used by a mobile operator, civil aviation, railway or police, may generally be guaranteed in terms of service quality due to policy exclusiveness and is relatively easy to schedule and control.

Alternatively, in an implementation of the present disclosure, the frequency domain resource used by the communication system 100 (or the frequency domain resource used by the network device and the terminal device based on the contention mechanism) may be an unlicensed frequency domain resource.

"An unlicensed frequency domain resource" may also be referred to as "an unlicensed spectrum resource" or "an unlicensed carrier", which means that each communication device may share the resource on an unlicensed frequency band. Wherein, "sharing the resource on an unlicensed frequency band" may refer to: only limits on emission power, out-of-band leakage and other indexes are specified for the use of a specific frequency band, so as to ensure that multiple devices sharing the frequency band meet basic coexistence requirements. Operators may achieve the purpose of network capacity distribution by using the unlicensed frequency band resource, but they need to comply with regulatory requirements on the unlicensed frequency band resource for different regions and different frequency bands. These requirements are usually formulated to protect public systems such as radars and ensure that multiple systems do not cause harmful effects to each other as much as possible and coexist fairly, including emission power limit, an out-of-band leakage index, indoor and outdoor use limit, and some additional coexistence strategies in some regions. For example, each communication device may adopt a contention way or a listening way, for example, a specified way such as Listen Before Talk (LBT) to use the frequency domain resource.

An unlicensed spectrum resource may be a spectrum resource designated by a relevant government department, but a radio technology, operator and service life are not restricted, and the service quality of this frequency band is not guaranteed. A communication device using an unlicensed spectrum resource is free to use the resource only if requirements on indexes such as emission power, out-of-band leakage are satisfied. A common system that uses an unlicensed spectrum resource for communication includes a Wi-Fi system, etc.

As an example but not a limitation, in an implementation of the present disclosure, the unlicensed spectrum resource may include a frequency band around 5 Giga Hertz (GHz), a frequency band around 2.4 GHz, a frequency band around 3.5 GHz, a frequency band around 37 GHz, and a frequency band around 60 GHz.

A signal transmission method of an implementation of the present disclosure will be described below with reference to FIGS. 2 to 6. It should be understood that FIGS. 2 to 6 are schematic flowcharts of the signal transmission method of the implementation of the present disclosure, showing detailed communication acts or operations of the method, but these acts or operations are only examples, and the implementation of the present disclosure may also execute other operations or transformations of various operations in FIGS. 2 to 6.

In addition, the acts in FIGS. 2 to 6 may be respectively executed in an order different from that is presented in FIGS. 2 to 6, and it may be not necessary to execute all of the acts in FIGS. 2 to 6.

FIG. 2 is a schematic flowchart of a signal transmission method 200 according to an implementation of the present disclosure. As shown in FIG. 2, the method 200 may include acts S210 and S210.

In act S210, a first device determines a target channel access mechanism from at least two channel access mechanisms, wherein the at least two channel access mechanisms are candidate channel access mechanisms for the first device to transmit a first signal on an unlicensed carrier.

In act S220, the first device performs channel sensing on the unlicensed carrier according to the target channel access mechanism, so as to determine whether a time frequency resource used by the first device for sending the first signal is available, wherein the first signal includes at least two reference signals, the at least two reference signals include a first reference signal and a second reference signal, and the first reference signal is located before the second reference signal on a time domain.

In an implementation of the present disclosure, the first device may determine a time frequency resource for data transmission when there is a scheduling requirement. For example, the first device may determine a time frequency resource for sending a first signal when determining that the first signal needs to be sent, or the first device may receive scheduling information of a second device and determine a time frequency resource for sending the first signal according to the scheduling information. Further, the first device may perform channel sensing to determine whether the time frequency resource for sending the first signal is available. Specifically, the first device may select a target channel access mechanism among at least two candidate channel access mechanisms, and each channel access mechanism may be used for indicating a mode for performing the channel sensing by the first device. Optionally, each channel access mechanism may also be used for indicating a mode of subsequent signal transmission in a situation that the channel sensing is successful, so that the first device may perform the channel sensing on the unlicensed carrier according to the determined target channel access mechanism, and determine whether the time frequency resource for sending the first signal is available according to the channel sensing result. Further, the first device may send the first signal on the time frequency resource for sending the first signal in a situation that the time frequency resource for sending the first signal is available, or may not send the first signal on the time frequency resource for sending the first signal if the time frequency resource for sending the first signal is unavailable.

Optionally, in an implementation of the present disclosure, the first device may be a network device, correspondingly, the first signal may include downlink synchronization signals or may include downlink synchronization signal blocks (SSB), where SSB includes PBCH, which is not restricted in implementations of the present disclosure. Alternatively, the first device may be a terminal device, correspondingly, the first signal may include uplink signals, for example, sounding reference signals (SRS) or the like, which is not restricted in implementations of the present disclosure.

It should be understood that in an implementation of the present disclosure, the first signal is transmitted separately, that is, the first signal is not transmitted together with other physical channels. Optionally, if the first device is a network device, the first signal is not transmitted simultaneously with a downlink physical channel, or if the first device is a terminal device, the first signal is not transmitted simultaneously with an uplink physical channel.

Optionally, in an implementation of the present disclosure, the first signal may include at least two reference signals, or the first signal may include only one reference signal. In a case where the first signal includes only one reference signal, the signal transmission method may refer to the implementation process where the first signal includes at least two reference signals. The following description mainly gives the example where the first signal includes at least two reference signals, which should not constitute any limitation on implementations of the present disclosure.

Optionally, in an implementation of the present disclosure, the first reference signal and the second reference signal may be the same reference signals, for example, the first reference signal and the second reference signal are both synchronization signals, or the first reference signal and the second reference signal are both CSI-RSs.

Optionally, in an implementation of the present disclosure, the first reference signal and the second reference signal may be different reference signals, for example, the first reference signal is a synchronization signal and the second reference signal is a CSI-RS, or the first reference signal is a CSI-RS and the second reference signal is a PT-RS.

Optionally, in an implementation of the present disclosure, the first reference signal and the second reference signal may be reference signals which are subjected to a same precoding processing, or the first reference signal and the second reference signal may be reference signals which are not subjected to a precoding processing.

Optionally, in an implementation of the present disclosure, the first reference signal and the second reference signal may be reference signals which are subjected to different precoding processing.

Herein, different precoding may correspond to different directions, therefore the first reference signal and the second reference signal may be considered as reference signals with different directions, that is, the first device may send at least two reference signals in different directions.

Optionally, the at least two channel access mechanisms may include a first type of channel access mechanism and a second type of channel access mechanism. Hereinafter, the first type of channel access mechanism and the second type of channel access mechanism will be described in detail.

The first type of channel access mechanism may be a single channel sensing with a deterministic sensing duration, i.e. the channel sensing is considered to be failed in a situation that the result of the single channel sensing is that the channel is occupied, and the channel sensing is considered to be successful in a situation that the result of the single channel sensing is that the channel is idle.

As an example but not a limitation, the first type of channel access mechanism includes that, after determining the time frequency resource for sending the first signal, the first device may perform channel sensing with a deterministic sensing duration of $T_{one-slot}$ on the unlicensed carrier before the time frequency resource for sending the first signal. If the channel is idle, then LBT may be considered to be successful, that is, the channel sensing is successful, and if the channel is occupied, then LBT is considered to be failed, that is, the channel sensing is failed. The deterministic sensing duration of $T_{one-shot}$ may be indicated by the network device, or may be determined according to a service priority, or may be specified by a communication system. Optionally, the deterministic sensing duration of $T_{one-shot}$ is 25 microseconds.

The second type of channel access mechanism is channel sensing based on a contention window, a size of the contention window may be determined according to a channel access priority, and the channel access priority may correspond to a set of channel access parameters. As shown in Table 1, when the channel sensing is performed according to the second type of channel access mechanism, the channel sensing may be performed according to the channel access parameters corresponding to the channel access priority. It should be understood that the less the number corresponding to the channel access priority in Table 1, the higher the priority. Optionally, the channel access priority may be determined according to a duration of the time domain resource of the first signal to be sent or the priority of the first signal to be sent.

As an example but not a limitation, the second type of channel access mechanism may specifically include the following acts S1-S6.

In act S1, a count value of a counter, $N=N_{init}$, wherein $N_{init}$ is a random number evenly distributed between 0 and $CW_p$, and act S4 is executed.

In act S2, if N is greater than zero, the count value of the counter is reduced by 1, i.e. N=N−1.

In act S3, a Clear Channel Assessment (CCA) slot sensing with a duration of $T_{s1}$ is performed on a channel (wherein the duration of $T_{s1}$ is 9 us, i.e. the duration of a CCA slot is 9 us), and if the CCA slot is idle, act S4 is executed, otherwise, act S5 is executed.

In act S4, if N is equal to zero, then the channel access process is terminated, otherwise, act S2 is executed.

In act S5, the CCA slot sensing with a time duration of $T_d$ ($T_d$=16+$m_p$*9 (us)) is performed on the channel, and the result of the CCA sensing is that at least one CCA slot is occupied or all CCA slots are idle.

In act S6, if the channel sensing result is that all CCA slots are idle within the time duration of $T_d$, then act S4 is executed, otherwise, act S5 is executed.

It should be noted that in this second type of channel access mechanism, the channel sensing may be considered to be successful only when the channel access process is terminated, otherwise the channel sensing is considered to be failed, instead of the channel sensing being considered to be successful when the channel is idle. Wherein, $CW_p$ and $m_p$ may be determined according to the priority of the service.

TABLE 1

| Channel Access Priority (p) | $m_p$ | $CW_{min, p}$ | $CW_{max, p}$ | $T_{mcot, p}$ | Allowable size of $CW_p$ |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 ms/10 ms | {15, 31, 63} |
| 4 | 7 | 15 | 1023 | 8 ms/10 ms | {15, 31, 63, 127, 255, 511, 1023} |

$CW_{min,p}$ is the minimum value of the $CW_p$ value corresponding to the channel access priority p, $CW_{max,p}$ is the maximum value of the $CW_p$ value corresponding to the channel access priority p, and $T_{mcot,p}$ is the maximum time duration which may be occupied by the signal transmission corresponding to the channel access priority.

It should be understood that in an implementation of the present disclosure, the table of channel access parameters corresponding to channel access priorities may be a table of channel access parameters used for downlink channel access in the existing LAA-LTE, such as Table 1. Optionally, it may be a table of channel access parameters for uplink channel access in the existing LAA-LTE. Optionally, the table of channel access parameters may be a table of channel access parameters newly defined according to a transmission duration supported by a signal, which is not restricted in implementations of the present disclosure.

Optionally, act S210 may specifically include: determining, by the first device, the target channel access mechanism from the at least two channel access mechanisms according to at least one of the following items: a duration of a time domain resource occupied by the first signal, a size of a subcarrier spacing corresponding to the first signal, the number of reference signals included in the first signal, a priority of the first signal, and an interference situation in a transmission direction of the first signal.

Optionally, in some implementations, the first device determines the target channel access mechanism from the at least two channel access mechanisms according to the duration of a time domain resource occupied by the first signal. For example, if the duration of the time domain resource occupied by the first signal is less than or equal to a first time duration, the first device determines that the target channel access mechanism is a first type of channel access mechanism. For another example, if the duration of the time domain resource occupied by the first signal is greater than the first time duration, the first device determines that the target channel access mechanism is a second type of channel access mechanism. It may be understood that a priority of the first type of channel access mechanism is higher than that of the second type of channel access mechanism. If the first signal occupies a relatively small time domain resource, a channel access mechanism with a higher priority may be used to quickly access the channel and transmit the first signal.

Optionally, in some implementations, the first device determines the target channel access mechanism from the at least two channel access mechanisms according to the priority of the first signal. For example, if the priority of the first signal is higher, the first device determines that the target channel access mechanism is the first type of channel access mechanism. For another example, if the priority of the first signal is lower, the first device determines that the target channel access mechanism is the second type of channel access mechanism. It may be understood that the priority of the first type of channel access mechanism is higher than that of the second type of channel access mechanism. If the priority of the first signal is higher, the channel access mechanism with a higher priority may be used to quickly access the channel and transmit the first signal.

Optionally, in some implementations, the first device determines the target channel access mechanism from the at least two channel access mechanisms according to the number of reference signals included in the first signal. For example, if the number of reference signals included in the first signal is less than or equal to a first preset value, the first device determines that the target channel access mechanism is the first type of channel access mechanism. For another example, if the number of reference signals included in the first signals is greater than a first preset value, the first device determines that the target channel access mechanism is the second type of channel access mechanism. It may be understood that the priority of the first type of channel access mechanism is higher than that of the second type of channel access mechanism. If the number of reference signals included in the first signal is relatively small, then the corresponding time domain resource occupied by the first signal is also relatively small The channel access mechanism with a higher priority may be used to quickly access the channel and transmit the first signal.

Optionally, in some implementations, the first device determines the target channel access mechanism from the at least two channel access mechanisms according to a size of a subcarrier spacing corresponding to the first signal. For example, if the size of the subcarrier spacing corresponding to the first signal is greater than or equal to a second preset value, the first device determines that the target channel access mechanism is the first type of channel access mechanism. For example, if the size of the subcarrier spacing corresponding to the first signal is less than a second preset value, the first device determines that the target channel access mechanism is the second type of channel access mechanism. It may be understood that the priority of the first type of channel access mechanism is higher than that of the second type of channel access mechanism. If the size of the subcarrier spacing corresponding to the first signal is relatively large, then the symbol duration of the first signal will be relatively short and the corresponding occupied time domain resource will be relatively small. The channel access mechanism with a higher priority may be used to quickly access the channel and transmit the first signal.

Optionally, in some implementations, the first device determines the target channel access mechanism from the at least two channel access mechanisms according to an interference situation in a transmission direction of the first signal. For example, if the interference in the transmission direction of the first signal is relatively large, that is, the energy of interfering signals in the transmission direction of the first signal is greater than or equal to a third preset value, the first device determines that the target channel access mechanism is the first type of channel access mechanism. For another example, if the interference in the transmission direction of the first signal is relatively small, that is, the energy of interfering signals in the transmission direction of the first signal is less than a third preset value, the first device determines that the target channel access mechanism is the second type of channel access mechanism. It may be understood that the priority of the first type of channel access mechanism is higher than that of the second type of channel access mechanism. If the interference in the transmission direction of the first signal is relatively large, the channel access mechanism with a higher priority has more opportunities for accessing the channel, so that the transmission of the first signal may be carried out with a higher probability.

Optionally, in some implementations, if the target channel access mechanism is the first type of channel access mechanism, the first device determines, according to the first type of channel access mechanism, that the maximum duration of a time domain resource which may be used by the first device on the unlicensed carrier is less than or equal to the first time duration.

In other words, if the first device determines that the target channel access mechanism is the first type of channel access mechanism, the first device may perform channel sensing according to the first type of channel access mechanism. Specifically, the first device determines that the time frequency resource for sending the first signal is available when detecting that the channel is idle, and may further send the first signal on the time frequency resource, or the first device determines that the time frequency resource for sending the first signal is unavailable when detecting that the channel is occupied, and does not send the first signal on this time frequency resource.

Optionally, under the first type of channel access mechanism, the maximum duration of a time domain resource which may be used by the first device on the unlicensed carrier is less than or equal to the first time duration (e.g., 1 ms), which is beneficial for avoiding unfairness between systems caused by the long-term occupation of the channel by the first device.

Hereinafter, two cases of the first type of channel access mechanism will be described with reference to implementations 1 and 2.

Implementation 1: The first device performs the channel sensing on the unlicensed carrier according to the first type of channel access mechanism, and determines whether a first time domain resource that the first device may use to send the first signal on the unlicensed carrier is available.

Further, the first device may send the first reference signal and the second reference signal on the first time domain resource in a situation that the first time domain resource is available, or the first device may not send the first reference signal and the second reference signal on the first time domain resource in a situation that the first time domain resource is unavailable.

Optionally, the first device may send the first reference signal and the second reference signal on the first time domain resource in a situation that the first time domain resource is available, and not send a physical channel on the first time domain resource.

It should be noted that in Implementation 1, when the first device performs the channel sensing by using the first type of channel access mechanism, no distinction is made between directions, that is, the first device may be considered to omnidirectionally detect the unlicensed carrier. Further, the first device may determine whether first time domain resource for sending the first signal is available according to a channel sensing result. Optionally, the first device may determine that the channel sensing is successful when it is detected that the channel is idle, thereby determining that the first time domain resource for sending the first signal is available. Further, the first device may send the first reference signal and the second reference signal on the first time domain resource. Alternatively, the first device determines that the channel sensing is failed when it is detected that the channel is occupied, thereby determining that the first time domain resource for sending the first signal is unavailable. Then the first device does not send the first reference signal and the second reference signal on the first time domain resource.

It should be understood that in Implementation 1, the first reference signal and the second reference signal may be sent omnidirectionally, that is, no distinction is made between directions. Alternatively, the first reference signal and the second reference signal may be sent in a specific direction, for example, the first reference signal and the second reference signal may be sent on the unlicensed resource through the first precoding matrix and the first time domain resource. Alternatively, the first reference signal and the second reference signal may be sent in different directions, for example, the first reference signal may be sent on the unlicensed resource through the first precoding matrix and the first time domain resource, and the second reference signal may be sent on the unlicensed resource through the second precoding matrix and the first time domain resource, which is not restricted in implementations of the present disclosure.

Optionally, in Implementation 1, the method 200 further includes: sending a filling signal between sending the first reference signal and sending the second reference signal, wherein the filling signal and the second reference signal are subjected to a same precoding processing.

In other words, the filling signal may be sent in an idle interval between the two reference signals. Optionally, the direction of the filling signal may be the same as the direction of a reference signal sent later, thus ensuring the continuity of the channel. Optionally, the filling signal may not carry useful information.

In other words, in Implementation 1, the channel sensing is performed on the unlicensed carrier according to the first type of channel access mechanism. Once the channel sensing is successful, at least two reference signals may be sent, the at least two reference signals may be sent omnidirectionally, or may be sent in the same direction, or may be sent in different directions. Optionally, the filling signal may be sent in an idle interval between the two reference signals, and the direction of the filling signal may be the same as the direction of a reference signal sent later, so as to ensure the continuity of the channel.

For example, in FIG. 3, the first device determines that the first signal needs to be sent, and the first signal includes the first reference signal (RS1) and the second reference signal (RS2). Therefore, the first device needs to determine whether the first time domain resource for sending the first signal is available through the channel sensing. The first device may perform the channel sensing on the unlicensed carrier according to the first type of channel access mechanism. The first device determines that the channel sensing is failed when it is detected that the channel is occupied, and determines that the first time domain resource is unavailable, so that the first device does not send the first reference signal and the second reference signal on the first time domain resource. The first device determines that the channel sensing is successful when it is detected that the channel is idle, and determines that the first time domain resource is available, so that the first device may send the first reference signal and the second reference signal on the first time domain resource.

Optionally, the directions of the first reference signal and the second reference signal may be different, that is, once the channel sensing is successful, the first device may send at least two reference signals with different directions on the first time domain resource. Optionally, if there is an idle interval between the first reference signal and the second reference signal, the first device may also send the filling signal between the first reference signal and the second reference signal, wherein the direction of the filling signal may be the same as the direction of the second reference signal, thus ensuring the continuity of the channel.

Implementation 2: The first device performs the channel sensing on the unlicensed carrier in a first direction according to the first type of channel access mechanism, and determines whether a second time domain resource which may be used by the first device for sending the first reference signal on the unlicensed carrier is available.

Further, the first device may send the first reference signal on the second time domain resource in a situation that the second time domain resource is available, or the first device may not send the first reference signal on the second time domain resource in a situation that the second time domain resource is unavailable.

Optionally, the first device may send the first reference signal on the second time domain resource in a situation that the second time domain resource is available, and not send a physical channel on the second time domain resource.

It should be noted that the first device sending the first reference signal on the second time domain resource may be the first device sending the first reference signal on the unlicensed carrier through the first precoding matrix and the second time domain resource, wherein the first precoding matrix corresponds to the first direction, that is, the first reference signal may be sent in the first direction, that is, the first device may send the first reference signal in the first direction when the channel sensing in the first direction is successful.

Optionally, in Implementation 2, the first device may also perform the channel sensing on the unlicensed carrier in a second direction according to the first type of channel access mechanism, and determines whether a third time domain resource which may be used by the first device for sending the second reference signal on the unlicensed carrier is available.

Further, the first device may send the second reference signal on the third time domain resource in a situation that the third time domain resource is available, or the first device may not send the second reference signal on the third time domain resource in a situation that the third time domain resource is unavailable.

Optionally, the first device may send the second reference signal on the third time domain resource in a situation that the third time domain resource is available, and not send a physical channel on the third time domain resource.

It should be noted that the first device sending the second reference signal on the third time domain resource may be the first device sending the second reference signal on the unlicensed carrier through the second precoding matrix and the third time domain resource, wherein the second precoding matrix corresponds to the second direction, that is, the second reference signal may be sent in the second direction, that is, the first device may send the second reference signal in the second direction when the channel sensing in the second direction is successful.

To sum up, in Implementation 2, when the first device performs the channel sensing on the unlicensed carrier, a distinction is made between directions. Therefore, the obtained sensing result is a channel sensing result for a certain direction, that is, the channel sensing result is used for indicating whether the channel in a certain direction is idle, so that the first device may determine whether the time frequency resource for transmitting signals in that direction is available according to the channel sensing result. Further, the first device may send corresponding signals on the time frequency resource in a situation that the time frequency resource is available, or may not send corresponding signals on the time frequency resource in a situation that the time frequency resource is unavailable.

Figure 4:
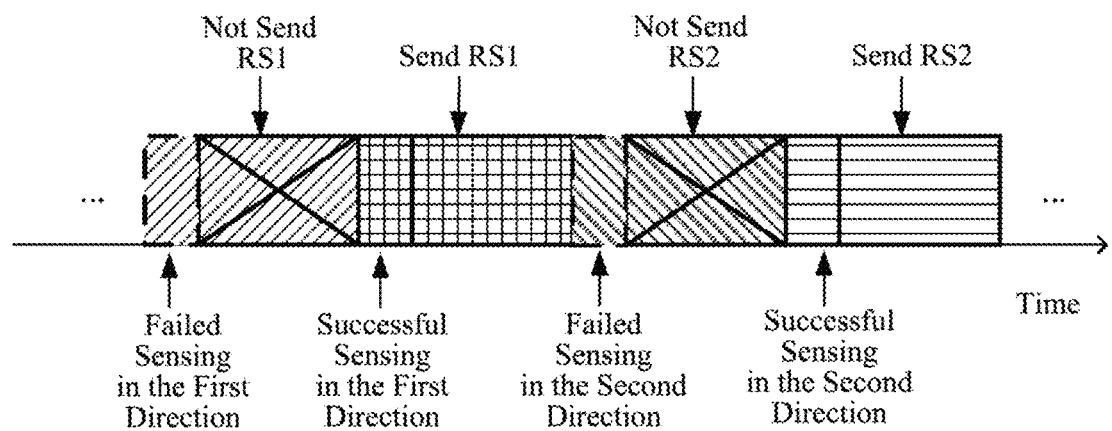
FIG. 4 is a schematic diagram of another example of a signal transmission method according to an implementation of the present disclosure.

For example, as shown in FIG. 4, the first device determines that the first signal needs to be sent, and the first signal includes the first reference signal (RS1) and the second reference signal (RS2). The first device may perform the channel sensing on the unlicensed carrier in the first direction according to the first type of channel access mechanism, and determines whether the second time domain resource for sending the first reference signal is available according to the channel sensing result. The first device determines that the channel sensing is failed when it is detected that the channel in the first direction is occupied, thereby determining that the second time domain resource for sending the first reference signal is unavailable. Then the first device does not send the first reference signal on the second time domain resource. Alternatively, the first device determines that the channel sensing is successful when it is detected that the channel in the first direction is idle, thereby determining that the second time domain resource for sending the first reference signal is available. Further, the first device may send the first reference signal on the second time domain resource.

Similarly, the first device may also perform channel sensing on the unlicensed carrier in the second direction according to the first type of channel access mechanism. Further, the first device may determine whether a third time domain resource for sending the second reference signal is available according to the channel sensing result. The first device may determine that the channel sensing is failed when it is detected that the channel in the second direction is occupied, thereby determining that the third time domain resource for sending the second reference signal is unavailable. Then, the first device may not send the second reference signal on the third time domain resource. Alternatively, the first device determines that the channel sensing is successful when it is detected that the channel in the second direction is idle, thereby determining that the third time domain resource for sending the second reference signal is unavailable. Thus, the first device may send the second reference signal on the third time domain resource.

To sum up, the difference between Implementation 1 and Implementation 2 is that: in Implementation 1, the channel sensing is performed according to the first type of channel access mechanism without making a distinction between directions, once the channel sensing is successful, at least two reference signals may be sent, while in Implementation 2, the channel sensing is performed according to the first type of channel access mechanism with making a distinction between directions, once the channel sensing is successful, one reference signal may be sent, or at least two reference signals may be sent.

Optionally, in some implementations, the target channel access mechanism is a second type of channel access mechanism, the second type of channel access mechanism is a channel sensing based on a contention window, and the first device determines, according to the second type of channel access mechanism, that the maximum duration of a time domain resource which may be used by the first device on the unlicensed carrier is greater than a first time duration.

Optionally, a channel access parameters used by the second type of channel access mechanism may be determined according to the duration of a time domain resource occupied by the first signal. For example, the channel access parameter may include a channel access parameter shown in Table 1, which are not restricted in implementations of the present disclosure.

Hereinafter, two cases of the second type of channel access mechanism will be described with reference to implementations 3 and 4.

Implementation 3: The first device performs the channel sensing on the unlicensed carrier according to the second type of channel access mechanism, and determines a fourth time domain resource which can be used by the first device for sending the first signal on the unlicensed carrier.

Further, the first device sends the first reference signal and the second reference signal on the fourth time domain resource in a situation that the fourth time domain resource is available, or does not send the first reference signal and the second reference signal on the fourth time domain resource in a situation that the fourth time domain resource is unavailable.

Optionally, the first device may send the first reference signal and the second reference signal on the fourth time domain resource in a situation that the fourth time domain resource is available, and not send a physical channel on the fourth time domain resource.

It should be understood that in Implementation 3, the first reference signal and the second reference signal may be sent omnidirectionally, that is, no distinction is made between directions. Alternatively, the first reference signal and the second reference signal may be sent in a specific direction, for example, the first reference signal and the second reference signal may be sent on the unlicensed resource through the first precoding matrix and the fourth time domain resource. Alternatively, the first reference signal and the second reference signal may be sent in different directions, for example, the first reference signal may be sent on the unlicensed resource through the first precoding matrix and the fourth time domain resource, and the second reference signal may be sent on the unlicensed resource through the second precoding matrix and the fourth time domain resource, which is not restricted in implementation of the present disclosure.

In Implementation 3, the first device may perform the channel sensing on the unlicensed carrier according to the second type of channel access mechanism, that is, the first device may perform the channel sensing on the unlicensed carrier according to the channel access priority. Optionally, the channel access priority may be determined by the first device according to the duration of a time domain resource of the first signal to be sent.

Optionally, in the implementation 3, the method further includes: sending a filling signal between sending the first reference signal and sending the second reference signal, wherein the filling signal and the second reference signal are subjected to a same precoding processing.

In other words, the filling signal may be sent on the fourth time domain resource in an idle interval between the two reference signals. Optionally, the direction of the filling signal may be the same as the direction of a reference signal sent later, thus ensuring the continuity of the channel.

Figure 5:
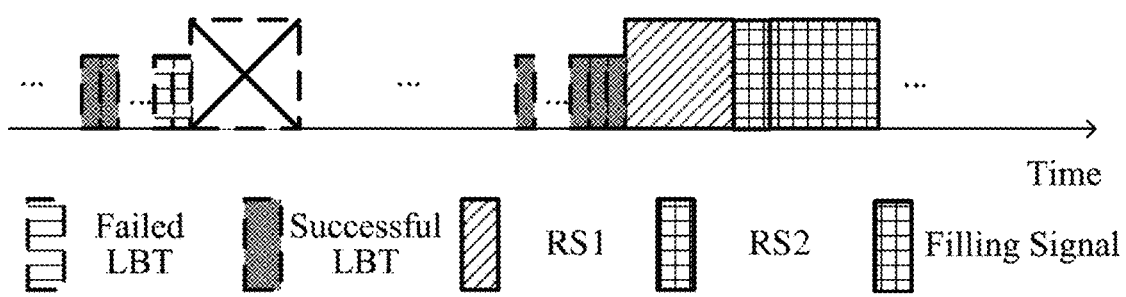
FIG. 5 is a schematic diagram of yet another example of a signal transmission method according to an implementation of the present disclosure.

For example, in FIG. 5, the first device determines that the first signal needs to be sent, and the first signal includes the first reference signal (RS1) and the second reference signal (RS2). Therefore, the first device needs to determine whether the fourth time domain resource for sending the first signal is available through the channel sensing. The first device may perform the channel sensing on the unlicensed carrier according to the second type of channel access mechanism. The first device determines the fourth time domain resource is unavailable in a situation that the channel sensing is failed, and does not send the first reference signal and the second reference signal on the fourth time domain resource. Alternatively, the first device determines that the fourth time domain resource is available in a situation that the channel sensing is successful, so as to send the first reference signal and the second reference signal on the fourth time domain resource.

Optionally, the directions of the first reference signal and the second reference signal may be different, that is, once the channel sensing is successful, the first device may send at least two reference signals with different directions on the fourth time domain resource. Optionally, if there is an idle interval between the first reference signal and the second reference signal, the first device may also send the filling signal between the first reference signal and the second reference signal, wherein the direction of the filling signal may be the same as the direction of the second reference signal, thus ensuring the continuity of the channel.

Implementation 4: The first device performs the channel sensing on the unlicensed carrier in a first direction according to the second type of channel access mechanism, and determines whether a fifth time domain resource which may be used by the first device for sending the first reference signal on the unlicensed carrier is available.

Further, the first device may send the first reference signal on the fifth time domain resource in a situation that the fifth time domain resource is available, or the first device may not send the first reference signal on the fifth time domain resource in a situation that the fifth time domain resource is unavailable.

Optionally, the first device may send the first reference signal on the fifth time domain resource in a situation that the fifth time domain resource is available, and not send a physical channel on the fifth time domain resource.

It should be noted that the first device sending the first reference signal on the fifth time domain resource may be the first device sending the first reference signal on the unlicensed carrier through the first precoding matrix and the fifth time domain resource, wherein the first precoding matrix corresponds to the first direction, that is, the first reference signal may be sent in the first direction, that is, the first device may send the first reference signal in the first direction when the channel sensing in the first direction is successful.

Optionally, the first device performs the channel sensing on the unlicensed carrier in a second direction according to the second type of channel access mechanism, and determines whether a sixth time domain resource which may be used by the first device for sending the second reference signal on the unlicensed carrier is available.

Further, the first device may send the second reference signal on the sixth time domain resource in a situation that the sixth time domain resource is available, or may not send the second reference signal on the sixth time domain resource in a situation that the sixth time domain resource is unavailable.

Optionally, the first device may send the second reference signal on the sixth time domain resource in a situation that the sixth time domain resource is available, and not send a physical channel on the sixth time domain resource.

It should be noted that the first device sending the second reference signal on the sixth time domain resource may be the first device sending the second reference signal on the unlicensed carrier through the second precoding matrix and the sixth time domain resource, wherein the second precoding matrix corresponds to the second direction, that is, the second reference signal may be sent in the second direction, that is, the first device may send the second reference signal in the second direction when the channel sensing in the second direction is successful.

Optionally, in the implementation of the present disclosure, channel access parameters for the second type of channel access mechanism in the first direction and the second direction may be the same, or a channel access parameter with the highest priority is used in both the first direction and the second direction, which is not restricted in implementations of the present disclosure.

Figure 6:
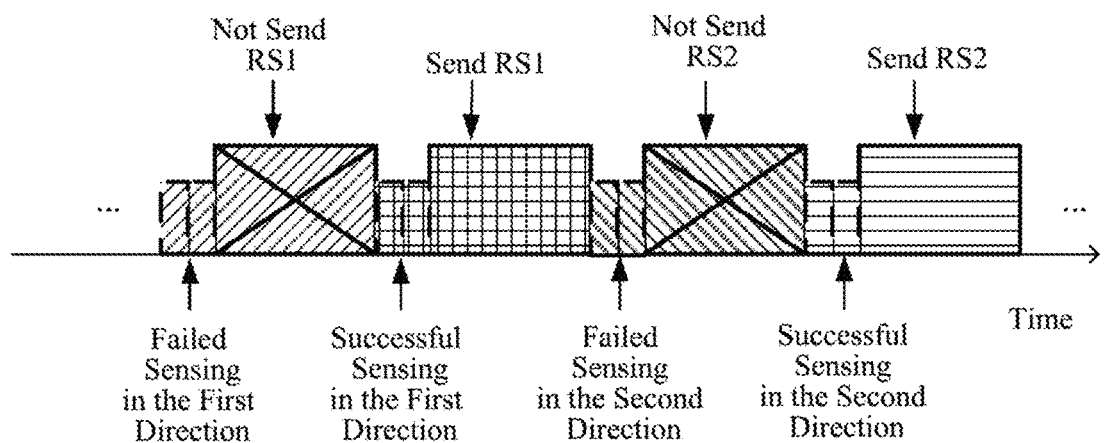
FIG. 6 is a schematic diagram of still another example of a signal transmission method according to an implementation of the present disclosure.

For example, as shown in FIG. 6, the first device determines that the first signal needs to be sent, and the first signal includes the first reference signal (RS1) and the second reference signal (RS2). The first device may perform the channel sensing on the unlicensed carrier in the first direction according to the second channel access mechanism, and determine whether the fifth time domain resource for sending the first reference signal is available according to the channel sensing result. Thereby, the first device determines that the fifth time domain resource for sending the first reference signal is unavailable in a situation that the channel sensing is failed, and then does not send the first reference signal on the fifth time domain resource. Alternatively, the first device determines that the fifth time domain resource for sending the first reference signal is available in a situation that the channel sensing is successful, and further may send the first reference signal on the fifth time domain resource.

Similarly, the first device may also perform the channel sensing on the unlicensed carrier in the second direction according to the second channel access mechanism, determine whether the sixth time domain resource for sending the second reference signal is available according to the channel sensing result, and perform subsequent data transmission, and this will not be repeated here.

It should be understood that the first device may select at least one channel access mechanism for signal transmission from implementations 1 to 4. For example, the first device may perform signal transmission only according to implementation 1, or the first device may perform signal transmission according to implementations 1 and 4, which is not restricted in implementations of the present disclosure.

It should be understood that when the first device uses signal transmission with a direction, because the signal with a direction has an additional beamforming gain on the receiving side, the first device may achieve a better effect on the receiving side by using a relatively small transmission power. According to a regional law, if the transmission power used by the first device is relatively small, a relatively large threshold may be used during channel listening, which increases the probability of judging that the channel is idle during channel sensing and further increases the success probability of channel access. Therefore, optionally, in an implementation of the present disclosure, the second threshold is greater than or equal to the first threshold, and the fourth threshold is greater than or equal to the third threshold, wherein the first threshold is an energy detection threshold for performing the channel sensing on the unlicensed carrier according to the first type of channel access mechanism (i.e., implementation 1), the second threshold is an energy detection threshold for performing channel sensing on the unlicensed carrier in a first direction according to the first type of channel access mechanism (implementation 2), the third threshold is an energy detection threshold for performing channel sensing on the unlicensed carrier according to the second type of channel access mechanism (implementation 3), and the fourth threshold is an energy detection threshold for performing channel sensing on the unlicensed carrier in a first direction according to the second type of channel access mechanism (implementation 4).

Method implementations of the present disclosure are described in detail above with reference to FIGS. 2 to 6, apparatus implementations of the present disclosure are described in detail below with reference to FIGS. 7 to 8. It should be understood that the apparatus implementations and the method implementations correspond to each other, and description of the method implementations may be referred to for similar description of the apparatus implementations.

Figure 7:
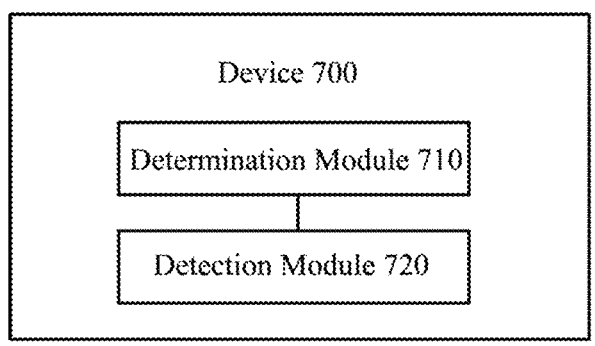
FIG. 7 is a schematic block diagram of a signal transmission device according to an implementation of the present disclosure.

FIG. 7 is a schematic block diagram of a signal transmission device according to an implementation of the present disclosure. A frequency domain resource on a carrier used by a communication system to which the device 700 belongs is a frequency domain resource used based on a contention mechanism. The device 700 of FIG. 7 includes: a determination module 710 and a detection module 720.

The determination module 710 is configured to determine a target channel access mechanism from at least two channel access mechanisms, wherein the at least two channel access mechanisms are candidate channel access mechanisms for the device to transmit a first signal on an unlicensed carrier.

The detection module 720 is configured to perform channel sensing on the unlicensed carrier according to the target channel access mechanism, so as to determine whether a time frequency resource used by the device for sending the first signal is available, wherein the first signal includes at least two reference signals, the at least two reference signals include a first reference signal and a second reference signal, and the first reference signal is located before the second reference signal on a time domain.

Specifically, the device 700 may correspond to (e.g., may be configured as or be itself) the first device described in the method 200, and various modules or units in the device 700 are respectively used for executing various actions or processes performed by the first device in the method 200. Wherein, in order to avoid redundancy, detailed description thereof is omitted.

Figure 8:
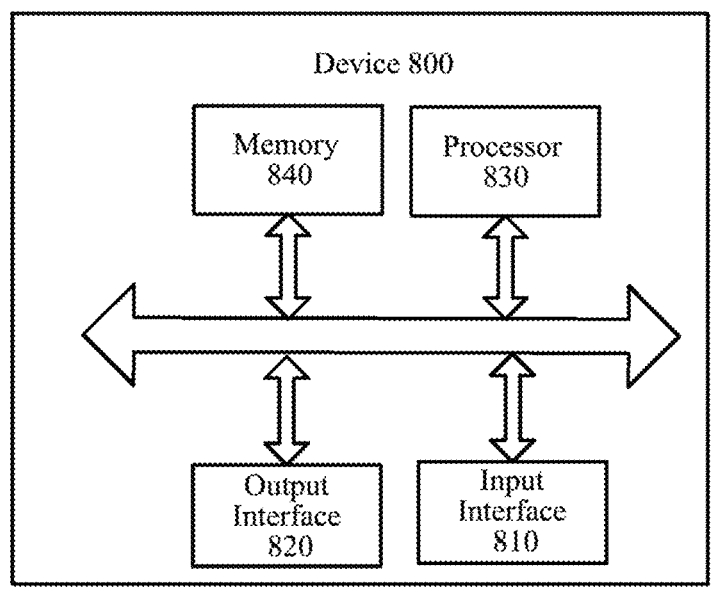
FIG. 8 is a schematic block diagram of a signal transmission device according to another implementation of the present disclosure.

As shown in FIG. 8, an implementation of the present disclosure also provides a device 800. The device 800 may be the device 700 in FIG. 7, and may be used for executing the contents of the first device corresponding to the method 200 in FIG. 2. The device 800 includes an input interface 810, an output interface 820, a processor 830, and a memory 840. The input interface 810, the output interface 820, the processor 830, and the memory 840 may be connected through a bus system. The memory 840 is used for storing programs, instructions, or codes. The processor 830 is used for executing programs, instructions, or codes in the memory 840 to control the input interface 810 to receive signals, to control the output interface 820 to send signals, and to complete the operations in the foregoing method implementations.

It should be understood that in an implementation of the present disclosure, the processor 830 may be a Central Processing Unit (CPU), or the processor 830 may be other general processor, digital signal processor (DSP), application specific integrated circuits (ASIC), field programmable gate arrays (FPGA) or other programmable logic device, discrete gate or transistor logic device, discrete hardware components, etc. The general processor may be a microprocessor, or the processor may be any conventional processor or the like.

The memory 840 may include the read only memory and random access memory, and provide instructions and data to the processor 830. A portion of memory 840 may include non-volatile random access memory. For example, the memory 840 may also store information of device type.

In an implementation process, various contents of the method described above may be accomplished by integrated logic circuits of hardware or instructions in the form of software in the processor 830. The contents of the method disclosed in connection with the implementations of the present disclosure may be directly embodied to be accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 840, and the processor 830 reads information in the memory 840 and completes the contents of the above method in combination with its hardware. In order to avoid repetition, it will not be described in detail here.

In a specific implementation, the determination module 710 included in the device 700 in FIG. 7 may be implemented by the processor 830 in FIG. 8, and the detection module 720 included in the device 700 in FIG. 7 may be implemented by the input interface 810 and the output interface 820 in FIG. 8.

An implementation of the present disclosure provides a computer readable storage medium, the computer readable storage medium stores one or more programs including instructions which, when executed by a portable electronic device including multiple application programs, enable the portable electronic device to perform the methods of the implementations shown in FIGS. 2 to 6.

An implementation of the present disclosure provides a computer program including instructions, which, when executed by a computer, enables the computer to execute the corresponding flows of the methods of the implementations shown in FIGS. 2 to 6.

Those of ordinary skill in the art will recognize that the exemplary elements and algorithm acts described in combination with the implementations disclosed in this document may be implemented in electronic hardware, or a combination of computer software and electronic hardware. Whether these functions are executed in hardware or software depends on the specific application and design constraints of the technical solution. Skilled technicians may use different methods to implement the described functions with respect to each particular application, but such implementation should not be considered to be beyond the scope of the present disclosure.

Those skilled in the art may clearly understand that for convenience and conciseness of description, the specific working processes of the systems, apparatuses and units described above may refer to the corresponding processes in the method implementations and will not be described here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of an implementation.

In addition, various functional units in various implementations of the present disclosure may be integrated in one processing unit, or the various units may be physically present separately, or two or more units may be integrated in one unit.

The function may be stored in a computer readable storage medium if realized in a form of a software functional unit and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device) to execute all or part of the acts of the method described in various implementations of the present disclosure. The aforementioned storage media include U disk, mobile hard disk, read-only memory (ROM), random access memory (RAM), magnetic disk or optical disk, and other media capable of storing program codes.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

What I claim is:

1. A signal transmission method, comprising:
determining, by a device, a target channel access mechanism from at least two channel access mechanisms, wherein the at least two channel access mechanisms are candidate channel access mechanisms for the device to transmit a signal on an unlicensed carrier; and
performing, by the device, a channel sensing on the unlicensed carrier according to the target channel access mechanism, to determine an availability of a time frequency resource to be used by the device for performing the signal transmission, wherein the signal comprises at least two reference signals, the at least two reference signals comprise a first reference signal and a second reference signal, and the first reference signal is located before the second reference signal on a time domain,
wherein a duration of a time domain resource occupied by the signal is used for determining, by the device, the target channel access mechanism from the at least two channel access mechanisms,
wherein a first type of channel access mechanism is channel sensing with a deterministic sensing duration;
wherein a second type of channel access mechanism is channel sensing based on a contention window;
wherein determining, by the device, the target channel access mechanism from the at least two channel access mechanisms, comprises:
determining, by the device, that the target channel access mechanism is the first type of channel access mechanism, when the duration of the time domain resource occupied by the signal is less than or equal to a first time duration,
wherein the first time duration is 1 millisecond.

2. The method of claim 1, wherein the first reference signal and the second reference signal are reference signals which are subjected to different precoding processing.

3. The method of claim 1, wherein the first reference signal and the second reference signal are reference signals with different directions.

4. The method of claim 1, wherein the first reference signal and the second reference signal comprise one of following: Channel State Information Reference Signal (CSI-RS), and Synchronization Signal Block (SSB).

5. A signal transmission device, the device comprising:
a memory; and
a processor, wherein the memory is used for storing instructions, and the processor is used for executing the instructions stored in the memory to:
determine a target channel access mechanism from at least two channel access mechanisms, wherein the at least two channel access mechanisms are candidate channel access mechanisms for the device to transmit a signal on an unlicensed carrier; and
perform a channel sensing on the unlicensed carrier according to the target channel access mechanism, to determine an availability of a time frequency resource to be used by the device for performing the signal transmission, wherein the signal comprises at least two reference signals, the at least two reference signals comprise a first reference signal and a second reference signal, and the first reference signal is located before the second reference signal on a time domain,
wherein the processor is specifically used for executing the instructions stored in the memory to:
determine the target channel access mechanism from the at least two channel access mechanisms according to a duration of a time domain resource occupied by the signal,
wherein the processor is further used for executing the instructions stored in the memory to:
determine that the target channel access mechanism is the first type of channel access mechanism, when a duration of the time domain resource occupied by the signal is less than or equal to a first time duration,
wherein the first time duration is 1 millisecond.

6. The device of claim 5, wherein the first reference signal and the second reference signal are reference signals which are subjected to different precoding processing.

7. The device of claim 5, wherein the first reference signal and the second reference signal are reference signals with different directions.

8. The device of claim 5, wherein the first reference signal and the second reference signal comprise one of following: Channel State Information Reference Signal (CSI-RS), and Synchronization Signal Block (SSB).

9. A non-transitory storage medium, used for storing computer software instructions that when executed by a processor, caused the processor to perform a signal transmission method, the method comprising:
determining a target channel access mechanism from at least two channel access mechanisms, wherein the at least two channel access mechanisms are candidate channel access mechanisms for a device to transmit a signal on an unlicensed carrier; and
performing a channel sensing on the unlicensed carrier according to the target channel access mechanism, to determine an availability of a time frequency resource to be used by the device for performing the signal transmission, wherein the signal comprises at least two reference signals, the at least two reference signals comprise a first reference signal and a second reference signal, and the first reference signal is located before the second reference signal on a time domain,
wherein a duration of a time domain resource occupied by the signal is used for determining the target channel access mechanism from the at least two channel access mechanisms,
wherein a first type of channel access mechanism is channel sensing with a deterministic sensing duration;
wherein a second type of channel access mechanism is channel sensing based on a contention window;
wherein determining the target channel access mechanism from the at least two channel access mechanisms, comprises:
determining that the target channel access mechanism is the first type of channel access mechanism, when the duration of the time domain resource occupied by the signal is less than or equal to a first time duration,
and wherein the first time duration is 1 millisecond.

* * * * *